United States Patent [19]

Braschel et al.

[11] Patent Number: 4,764,882

[45] Date of Patent: Aug. 16, 1988

[54] METHOD OF MONITORING FATIGUE OF STRUCTURAL COMPONENT PARTS, FOR EXAMPLE, IN NUCLEAR POWER PLANTS

[75] Inventors: Reinhold Braschel, Stuttgart; Manfred Miksch, Erlangen; Rolf Schiffer, Hagenau, all of Fed. Rep. of Germany

[73] Assignee: Kraftwerk Union Aktiengesellschaft, Mülheim/Ruhr, Fed. Rep. of Germany

[21] Appl. No.: 601,643

[22] Filed: Apr. 18, 1984

[30] Foreign Application Priority Data

Apr. 19, 1983 [DE] Fed. Rep. of Germany ..... 33141819

[51] Int. Cl.[4] ........................ G01M 7/00; G06F 15/52; G21C 17/00

[52] U.S. Cl. ...................................... 364/508; 73/794; 376/249; 376/247; 364/527

[58] Field of Search ............... 364/507, 508, 492, 527, 364/133, 187, 300; 376/245, 247, 249; 73/794, 602, 628, 625, 626

[56] References Cited

U.S. PATENT DOCUMENTS

| | | | |
|---|---|---|---|
| Re. 31,750 | 11/1984 | Morrow | 364/508 |
| 4,184,205 | 1/1980 | Morrow | 364/508 |
| 4,213,183 | 7/1980 | Barron et al. | 364/507 |
| 4,330,367 | 5/1982 | Musick | 376/245 |
| 4,370,889 | 2/1983 | Ruthrof | 376/249 X |
| 4,411,858 | 10/1983 | Smith | 376/247 |
| 4,421,716 | 12/1983 | Hench et al. | 364/527 X |
| 4,459,259 | 7/1984 | Colley | 364/492 X |
| 4,524,622 | 6/1985 | Suzuki et al. | 73/628 X |
| 4,531,409 | 7/1985 | Koch et al. | 73/602 X |
| 4,541,059 | 9/1985 | Toshihiko | 364/508 |
| 4,585,609 | 4/1986 | Le Rat | 376/245 |

FOREIGN PATENT DOCUMENTS

| | | |
|---|---|---|
| 1025898 | 3/1958 | Fed. Rep. of Germany . |
| 1698476 | 12/1969 | Fed. Rep. of Germany . |
| 1919122 | 9/1970 | Fed. Rep. of Germany . |
| 1404453 | 10/1971 | Fed. Rep. of Germany . |
| 2151661 | 4/1973 | Fed. Rep. of Germany . |
| 2314954 | 10/1974 | Fed. Rep. of Germany . |
| 2627209 | 12/1976 | Fed. Rep. of Germany . |
| 2737747 | 3/1978 | Fed. Rep. of Germany . |
| 2748607 | 5/1978 | Fed. Rep. of Germany . |
| 2953044A1 | 12/1980 | Fed. Rep. of Germany . |
| 3133222 | 3/1983 | Fed. Rep. of Germany . |

OTHER PUBLICATIONS

Herzog, "Forecasting Failures with Acoustic Emission", *Machine Design*, vol. 45, Jun. 14, 1973, pp. 132–137.

Jackson, "Methods and Limitation for In-Service Inspection of Nuclear Power Plants", *Nuclear Engineering Int'l., Oct. 1976, pp. 61–64.*

Chockie et al., "The Comphrehensive Approach to In-Service Inspection", *Nuclear Engineering Int'l.*, Oct. 1976, pp. 64–67.

*Primary Examiner*—Errol A. Krass

*Assistant Examiner*—Joseph L. Dixon

*Attorney, Agent, or Firm*—Herbert L. Lerner; Laurence A. Greenberg

[57] ABSTRACT

A method of monitoring fatigue of a stressed component part such as in nuclear power plants or aircraft, with sensors attached to the outside of the component part to be monitored, includes feeding values measured by the sensors at the component parts to be monitored at a given timing cycle to a process computer. The process computer contains a first arithmetic unit (LCID) which determines weighting factors for addressing mechanical unit load cases and/or directly comparing stresses specific to a load case, from the measured values with the aid of a stress file (LCL) of specified unit load cases, and storing them in a working memory. They are assigned in a second arithmetic unit (HSP VSP), in accordance with the comparison stresses determined by the first arithmetic unit (LCID) and/or on the basis of measured data stored in the working memory (FIFO II), after they are resolved in accordingly weighted unit values, utilizing a first memory including two unit load case libraries (TLL, MLL). They are stored in a weighted manner and in a timing cycle in a second memory (STACK VSP). The second memory is controlled with a third arithmetic unit (RFL). A partial usage factor obtained during an evaluation cycle of the component part is calculated from a comparison stress curve, utilizing fatigue curves stored in a memory (FAT). The partial usage value is added to a previous usage factor stored in a further working memory (RAM USE I), whereby an actual overall usage factor ($U_{ges}$) is obtained.

19 Claims, 4 Drawing Sheets

FIG. 2
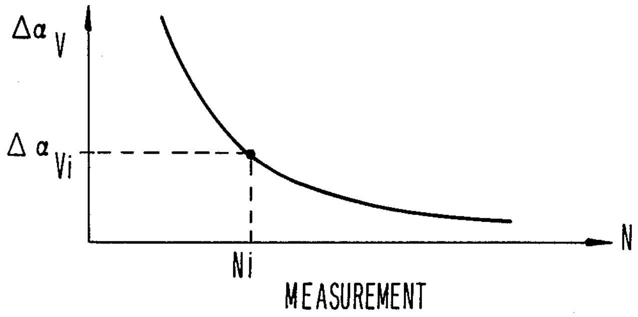
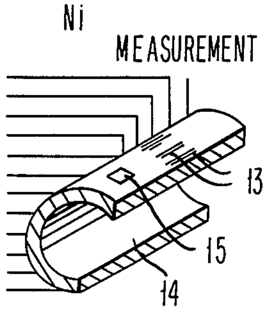
FIG. 3
FIG. 4
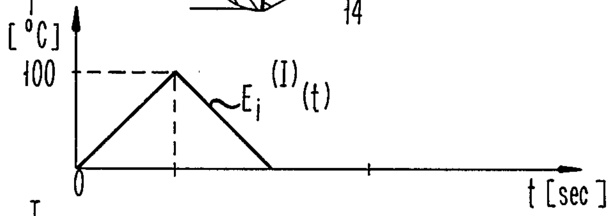
FIG. 5
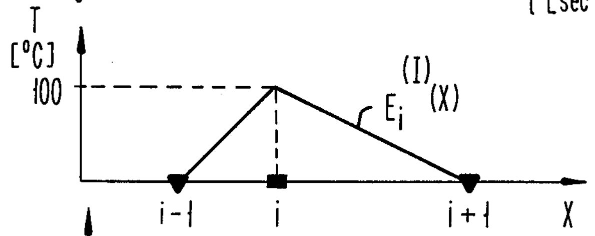
FIG. 6
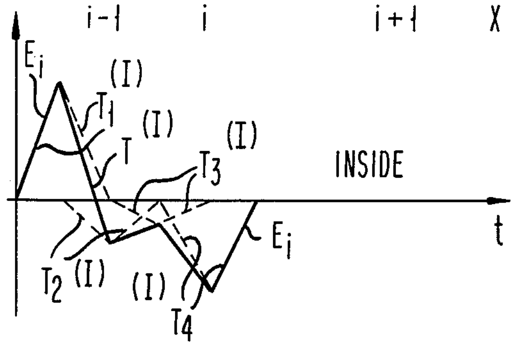

METHOD OF MONITORING FATIGUE OF STRUCTURAL COMPONENT PARTS, FOR EXAMPLE, IN NUCLEAR POWER PLANTS

BACKGROUND OF THE INVENTION:

1. Field of the Invention:

The invention relates to a method of monitoring fatigue of preferably thermally and/or mechanically stressed structural component parts, such as in nuclear power plants or generating installations or in aircraft, with sensors attached to the outside of the monitored structural component parts.

2. Description of the Related Art:

Fatigue analyses for individual parts such as a feedwater nozzle in a nuclear power generating station, for example, have heretofore been performed on the basis of under-load specifications which, besides thermal and mechanical load data, contain assumptions regarding the expected frequency of mechanical load conditions. The disadvantage of such a specification resides in the theoretical assumptions which frequently do not agree with the stresses actually determined by measurement during operation.

On the other hand, an accurate fatigue analysis is desirable so that it can be predicted as precisely as possible when a given structural component part has reached its maximum degree of utilization and accordingly must be replaced.

SUMMARY OF THE INVENTION:

It is an object of the invention to provide a method of monitoring fatigue of structural parts, for example, in a nuclear power generating station, which makes possible a plant supervision supported by actually accumulated measurement data.

With the foregoing and other objects in view, there is provided, according to the invention, a method which includes feeding the data measured by sensors at the component parts to be monitored at a fixed timing cycle to a process computer. The process computer contains a first arithmetic unit which resolves the measured course or pattern of the measured values into uniform elementary courses subjected to different weighting factors in such a manner that a superposition of these elementary courses, which are weighted with the weighting factors and are preferably triangular, results in an approximation to the actually measured waveshape of the respective measurement values. Values which are stored on at least one first memory for the elementary voltage waveforms generated by these elementary shapes of the measured values, are called up by these elementary shapes of the measured values. The actual voltage waveform is approximated in a second arithmetic unit by superimposition of these elementary voltage waveforms, weighted with the above-mentioned weighting factors and storing them in a second memory. The partial degree of utilization (usage factor) of the component part obtained during an evaluation cycle is calculated with a third arithmetic unit from this stored, approximated voltage waveform, using voltage-dependent fatigue curves stored in a third memory. These are passed on to a further memory, wherein the partial degree of utilization is added to the overall degree of utilization stored therein, and forms a new value for the overall degree of utilization.

In a practical example this means, for example, that temperature sensors are arranged along the periphery of a component part, for example, a feedwater nozzle in a nuclear power generating station. On the basis of the local temperature distribution and/or the temperature-vs-time curve, the respective temperature curves in the interior of this part are then calculated (regressive temperature analysis). On the basis of these temperatures calculated for the interior of the component part, the tension patterns in the wall material of the part can be determined. This basically very complicated procedure is simplified in that the calculations are made not for the actually measured pattern of the measurement values, but for "elementary patterns", so-called elementary transients, as the superposition of which the actually measured temperature curve can be presented in approximation, using certain weighting factors. Due to the linearity of the system of equations applicable to the calculation of the stress patterns from the temperature patterns, the actually occuring tension pattern also can be presented as a corresponding superposition of elementary tension patterns i.e. provided with the same weighting factors which correspond to the elementary temperature cycles. The approximated comparison stress pattern established by this superposition is then worked up by means of the conventional Rainflow or Reservoir algorithm, i.e., is converted into partial degrees of utilization. In this manner, the partial usage factor obtained during the evaluation cycles can be added up to yield the most recent overall usage factor, which is characteristic of the fatigue of a component part.

In a manner similar to that explained in the preceding paragraph by the example of measured temperature values, mechanical values measured on the component part can also be converted into partial usage factors.

On the other hand, there may be provided in parallel therewith, that besides the measured values taken off directly at the component part to be monitored, operating data also are used to identify the load case or condition, for example, from a control room or a control console, the operating system to which the component part to be monitored belongs. In a nuclear power station, such load cases are, for example, "start", "fast shutdown", and so forth. To these individual load cases can then be assigned certain reference (comparison) stress cycles which are determined empirically or calculated or estimated on the basis of assumption, so that in the identification of such load cases a comparison stress pattern is produced by possible additional superposition with suitably weighted mechanical unit load cases, which can likewise be converted again into a partial usage factor by means of the Rainflow algorithm.

The advantages of the method can be summarized as follows:

(a) The uniform procedure leads to comparable results for all parts and provides indications of critical parts.

(b) The determination, in time, of the individual operating processes and the continuous temperature measurements lead to an accurate determination of the usage factors.

(c) If a critical trend is recognized during the monitoring, it is possible to increase the life of individual imperiled components in time by a new protective operating procedure to be determined.

(d) Readings in ultrasonic tests can be followed up continuously and in a targeted manner.

(e) By monitoring the growth of cracks, it is possible to continue the operation of the installation even if a calculated utilization of the life expectancy of the component with a ratio of 1.0 is attained. The numerical value is a ratio of the actual time under load to a nominal life expectancy. A ratio of 1.0 means that the life expectancy has expired.

(f) Through this monitoring, a programmed and therefore economical performance of possibly required repair measures is possible.

(g) The continuous monitoring of the operation leads to gapless acquisition of operating data (log).

(h) The system of monitoring the operation makes possible, for example, for all areas in power stations, a more accurate and, above all, also more economical conduct of stress and fatigue analyses.

The invention can be used not only in the field of power generating stations described by way of example, but also in other fields. As a further example, the checking of the fatigue of parts of aircraft, and the like, may be mentioned.

Other features which are considered as characteristic for the invention are set forth in the appended claims.

Although the invention is illustrated and described herein as embodied in a method of monitoring fatigue of structural component parts, for example, in nuclear power plants, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings.

BRIEF DESCRIPTION OF THE DRAWING:

FIG. 2 is a fatigue curve for the component (fatigue curve specific to the material);

FIG. 3 is a schematic and diagrammatic view of an arrangement of several temperature sensors along the outer circumference of a tubular part component for performing the method;

FIG. 4 is a plot diagram of a waveform of an elementary transient;

FIG. 5 is a plot diagram showing the local shape of an elementary transient;

FIG. 6 is a plot diagram depicting the superposition in time of several weighted elementary transients;

Figure 1:
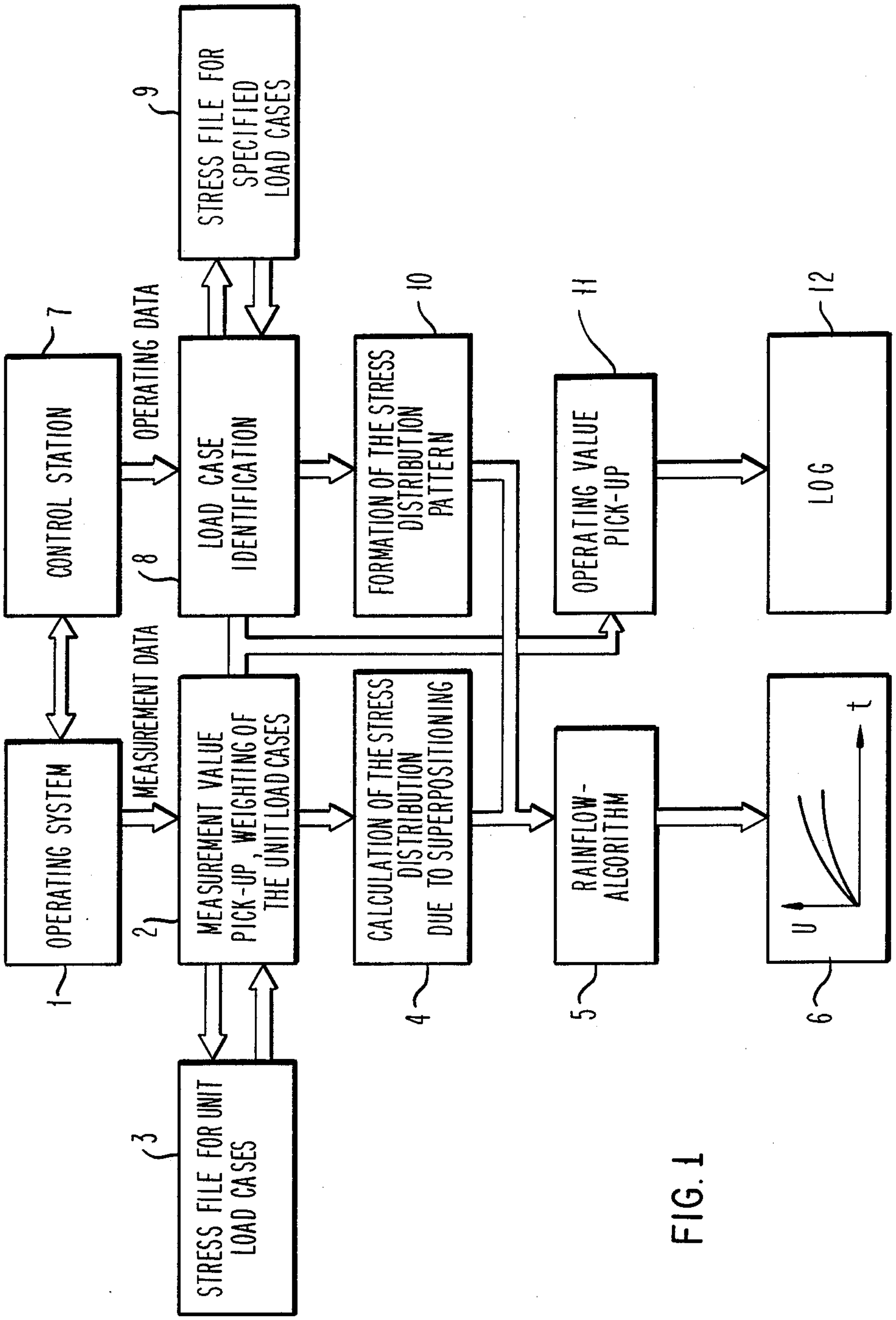
FIG. 1 is a flow diagram of the method of monitoring fatigue of structural components according to the invention.

DESCRIPTION OF THE PREFERRED EMBODIMENTS:

Referring now to the drawing and first, particularly, to FIG. 1 thereof, there is shown a flow chart for the method of monitoring fatigue of structural component parts in a nuclear power plant or generating station. It is noted that throughout the following description T refers to temperature, I refers to the inside of a pipe and A refers to the outside of a pipe. The basis for the fatigue analysis is an empirically determined fatigue curve specific for a material, as is shown, for example, in FIG. 2. In FIG. 2, the respective maximally permissible number N of load changes is correlated with individual comparison stress vibration amplitudes $\Delta\sigma_v$. The material fatigue caused by n equal load change variations is expressed by the degree of utilization or usage factor $$U=(n/N) \quad (1)$$

For different load change fluctuations $\Delta\sigma_{vi}$ there is obtained an overall usage factor $U_{ges}$ as the sum of individual partial usage factors $$U_{ges} = \sum_i U_i = \sum_i \frac{n_i}{N_i} \quad (2)$$

wherein $n_i$ is the number of load changes that have actually occured, referred to the corresponding comparison stress change $\Delta\sigma_{vi}$, and $N_i$ is the maximum number of load changes obtained from the curve according to FIG. 2.

In particular, the requirements of these statements in the operation of reactor systems are obtained from ASME Code Sect. III (Stress Categories). The overall usage factor at a given time can be determined by the monitoring device in accordance with the invention.

The operating system 1 in FIG. 1, for example, a nuclear power plant, furnishes certain measurement values. In Box 2, there then follow the measurement value acquisition ("pick up") and the weighting of the unit load cases.

The most important measurement values, on the basis of which the stress distribution and therefrom then the usage factor is calculated, are the temperatures, since it is in general not possible, for example, due to the lack of suitable strain gage strips which are stable over long period of time, to measure the stress patterns in the material directly and make them the basis for the determination of the usage factor. The calculation is therefore made on the basis of a regressive temperature analysis (thermal backward-analysis), which starts from the assumption that, from the outside temperatures, the pattern of which in time and space can be measured by suitable sensors, the temperature distribution in the entire structure and therefrom again the stress distribution can be calculated.

The temperatures can be measured, as schematically and diagrammatically shown in FIG. 3, by suitable sensors 13 which, in the illustrated embodiment are arranged at a pipe section 14. The monitoring device according to the invention makes use of a particularly simple calculation of the stress distribution, which is therefore comprehensively shown hereinafter:

In general, the heat conduction equation $$\frac{\partial T}{\partial t} = a \cdot \left( \frac{\partial^2 T}{\partial x^2} + \frac{\partial^2 T}{\partial y^2} + \frac{\partial^2 T}{\partial z^2} \right) \quad (3)$$

is applicable.

If a is assumed to be a constant and if $T_1$ and $T_2$ are temperature fields i.e. solutions of Equation (3) which satisfy boundary conditions $R_1$ and $R_2$, then $T=T_1+T_2$, as well as (for constant r) $T=r \cdot T_1$ are solutions of Equation (3) which satisfy the boundary conditions $R=R_1+R_2$ and $R=r \cdot R_1$, respectively.

The invention makes use of this superposition principle by putting together, in accordance with the building-block principle, complex temperature patterns approximatively from elementary triangular temperature waveforms, so-called "elementary transients". An attempt is made, in this regard, to present the temperature pattern R measured on the outside (boundary condition) as a superposition of surface temperatures $R_i$ of the inside surface obtained from suitable weighted elementary transients $T_1^I \ldots T_n^I$ (FIG. 6), i.e.

$$R = \sum_i r_i \cdot R_i \quad (4)$$

The temperature field T belonging to the surface temperature R is then given in approximation by $$T = \sum_i r_i \cdot T_i \quad (5)$$

The elementary transients $T_i$ employed herein are defined by the temperature pattern occuring on the inside of the corresponding component part (for example, of a pipe section 14 according to FIG. 3)

$E_i^{(I)}(x, t)$, as shown in FIGS. 4 and 5.

In these FIGS. 4 to 6, i designates the point on the inside opposite the measuring point y; $E^{(I)}$ the temperature pattern on the inside; and (x, t) the dependence upon the coordinates of location and time.

FIG. 6 shows how a uniformly piecewise linear inside temperature curve $T^{(I)}$ (shown by a continuous or solid line) can be obtained by superposition of elementary transients $T_1^{(I)}$, $T_2^{(I)}$, $T_3^{(I)}$, $T_4^{(I)}$, which are shifted in time relative to one another and are differently weighted, and the shapes or courses of which on the inside have the form of simple triangles, as shown in FIG. 4.

Figure 7:
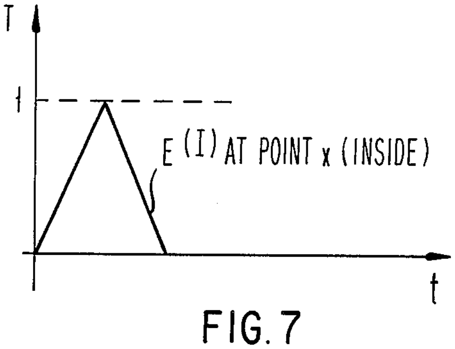
FIG. 7 is a plot diagram providing a further presentation of an elementary transient at a point x of the inside of a component part.
Figure 8:
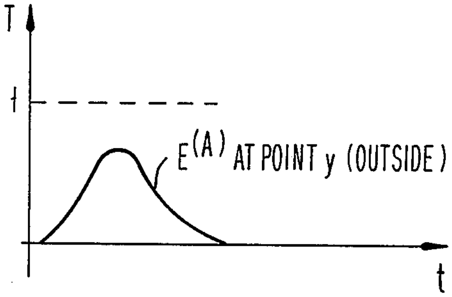
FIG. 8 is a plot diagram of a temperature curve obtained from the elementary transient of FIG. 7 as a response ("reply") at the point y on the outside opposite the aforementioned point x on the inside.
Figure 9:
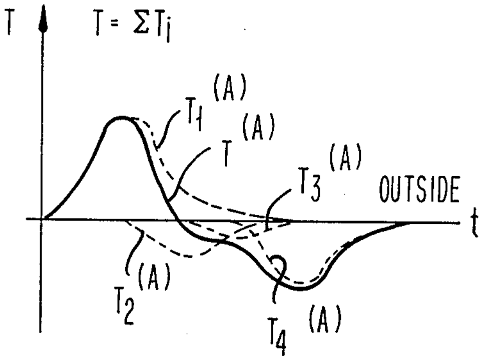
FIG. 9 is a plot diagram of a reply to superimposed elementary transients according to FIG. 6 which is produced by superposition of replies according to FIG. 8.

As is apparent from FIGS. 7 to 9, there results as a response ("reply") to an elementary transient $T_E^{(I)}$ at a point x on the inside of a component part (FIG. 7), the temperature curve $E^{(A)}$ according to FIG. 8 at the opposite point y on the outside. Similarly, a "reply" to the temperature curve according to FIG. 6 can be determined by superposition of the "replies" $T_1^{(A)}$–$T_4^{(A)}$ according to FIG. 9.

The aforementioned backward temperature analysis determines from a measured outside temperature pattern the corresponding inside temperature pattern in accordance with the following scheme: First, the outside temperature $T^{(A)}$ is constructed in approximation as a superposition of replies $E_i^{(A)}$, i.e. of elementary curves and elementary transients, respectively, for the outside surface at the location i:

$$T^{(A)} = \sum_i r_i \cdot E_i^{(A)} \quad (6)$$

Graphically, the measured pattern of the outside temperature would be replaced by a multiplicity of superimposed triangular elementary temperature curves which are shifted in time relative to one another and are differently weighted. The individual weighting factors $r_i$ are determined so that an optimum approximation to the actually measured pattern of the outside temperature is achieved.

With this approximation, the mean square error is minimized. Expressed mathematically, this means that the integral $$\int_{\text{time}} \int_{\text{location}} \left[ E_i^{(A)}(x,t) - \sum_i r_i \cdot E_i(\text{A})(x,t) \right]^2 dxdt$$

is minimized.

Due to the linearity of the heat conduction equation (3), conclusions can the be drawn as to the temperature pattern on the inside:

$$T^{(I)} = \sum_i R_i \cdot E_i^{(I)} \quad (7)$$

Compare the FIGS. 8 and 7 also in this connection. From FIGS. 7 and 8, it can be seen clearly how an assumed elementary temperature pattern at the inside wall of the pipe at the point x (FIG. 7) brings about a temperature pattern on the outside wall, shifted in time.

From the temperature distribution clearly determined by the pattern of the inside temperature, the corresponding state of stress can then be determined according to the generalized Hook's law as follows:

$$\sigma_x = -y \cdot T + \lambda \cdot \left( \frac{\partial u}{\partial x} + \frac{\partial v}{\partial y} + \frac{\partial w}{\partial z} \right) + 2\mu \frac{\partial u}{\partial x} \quad (8)$$

$$\sigma_y = -y \cdot T + \lambda \cdot \left( \frac{\partial u}{\partial x} + \frac{\partial v}{\partial y} + \frac{\partial w}{\partial z} \right) + 2\mu \frac{\partial v}{\partial y}$$

$$\sigma_z = -y \cdot T + \lambda \cdot \left( \frac{\partial u}{\partial x} + \frac{\partial v}{\partial y} + \frac{\partial w}{\partial z} \right) + 2\mu \frac{\partial w}{\partial z}$$

$$\tau_{xy} = \mu \left( \frac{\partial v}{\partial x} + \frac{\partial u}{\partial y} \right)$$

$$T_{xz} = \mu \left( \frac{\partial u}{\partial z} + \frac{\partial w}{\partial x} \right)$$

$$T_{yz} = \mu \left( \frac{\partial w}{\partial y} + \frac{\partial v}{\partial z} \right)$$

with $$y = \frac{E\alpha}{1 - 2\nu}, \quad \lambda = \frac{E \cdot \nu}{(1 + \nu)(1 - 2\nu)}, \quad \mu = \frac{E}{2(1 + \nu)}$$

The material data E, $\alpha$ and $\mu$ are assumed to be constant. If the first three equations are solved for T, the variables u, v, w as well as the $\sigma$'s and the $\tau$'s are combined in a vector $\bar{s}$ and the vector (T, T, T, O, O, O) is further identified as $\overline{T}$, the equation (8) can be rewritten as follows:

$$\overline{T}=\overline{D}(s) \quad (9)$$

where D is a linear differential operator. As is well known, this system can be solved clearly with predetermined shifts or predetermined forces at the boundary region, taking into consideration the body-equilibrium conditions.

From this there follows: If the temperature field T can be represented according to Equation (5) as a superposition of elementary transients $T_i$ and if the state of stress $s_i$ resulting therefrom is known for every $T_i$, the Equation (9) can also be solved by superposition, namely in the form $$s = \sum_i r_i s_i \quad (10)$$

This means that the weightings of the individual elementary transients determined by the backward temperature analysis explained with the aid of FIGS. 4 to 9 can also be substituted directly in the superposition of the individual stress patterns. The governing weighting factors for the individual elementary temperature transients determined in the backward temperature analysis are established on Block 2 in accordance with the flow diagram shown in FIG. 1.

The elementary comparison stress patterns corresponding to the elementary transients $T_i$ of the temperature of the inside surface are stored in the stress file specific to building blocks for unit load cases, in FIG. 1, Block 3. From this stress file for unit load cases, the comparison stress curves stored for the comparison stress pattern specific to building blocks are called up and multiplied in Block 2 by the corresponding weighting factors. The actual stress pattern is determined in Block 4 by superposition from the elementary stress waveshapes called up in the stress file and weighted in Block 2.

From this stress pattern thus determined in Block 4, the usage factor is calculated in Block 5 by means of a certain algorithm. This algorithm is known as "Rainflow" or Reservoir algorithm. Essentially it is based on the fact that the determined stress curve is resolved into a finite number of simple-periodic processes (note K. Roik, Lectures on Steel Construction, published by Wilhelm Ernst and Son, 1978, p. 69). For each of these processes, a material-dependent partial usage factor is stored in a memory FAT.

From the fatigue curve according to FIG. 2 applicable to the component part and the material, respectively, the partial usage factor $U_i$ which is to be used for the individual periodic elementary cycle and which enters into the determination of the overall usage factor according to Equation (2), is then obtained in Block 5, using the Rainflow algorithm. In Block 6, the result appears, namely, the added-up waveform of the overall usage factor, which is transferred to peripheral equipment.

The hereinafore-described part of fatigue monitoring of a given structural component part by continuous recording of the usage factor can be characterized in summary as follows: On the basis of measured data which measure the outside temperatures, first the inside temperatures are calculated back; the inner temperature profile is resolved into weighted "elementary transients". To the individual elementary transients obtained by dividing up the temperature pattern, stress transients calculated in advance from a file are individually correlated and are superposed to form a stress curve. From the superimposed stress curve, partial usage factors and, therefrom, usage factors according to the Rainflow method are calculated with the aid of predetermined fatigue curves. The replacement of the monitored part can be planned in time before the overall usage factor reaches its upper permissible limit i.e. the value 1.

In parallel with the determination of the usage factor described so far, a second fatigue monitoring activity for component parts takes place, the stress of which cannot be determined by outside temperature measurements, or only insufficiently so. With the aid of various operating signals specific to a system, which can be taken essentially from the control station 7 in the embodiment example of a nuclear power plant, the corresponding load cases are identified in Block 8. Such typical load cases are, for example: Slow start-up, fast shutdown, and so forth. The stress file shown in Block 9 contains the corresponding comparison stress curves for such identified load cases. This means that the corresponding stresses are taken from the stress file out of Block 9 for every load case identified on the basis of certain operating signals or operating signal combinations, and are compiled in Block 10 to form a stress curve. The data which are stored in the stress file in Block 9, were determined on the basis of theoretical considerations and/or calculations, or had been measured in the past for specific load cases. These are therefore stress patterns known from before, either calculated or measured, for special load cases, from which the stress pattern is composed in Block 10. From Block 10, the flow of information again leads to Block 5, where the partial usage factor is calculated from this comparison stress curve by means of the Rainflow or Reservoir algorithm. The calculation of the partial usage factor in Block 5 on the path via the Blocks 7 to 10 i.e. on the basis of the load case identification and the stress data determined for identified load cases due to previous runs and/or calculations, therefore, proceeds in parallel with the determination of the usage factor via the temperature and other mechanical data measured directly on the component part to be monitored and the processing thereof in Blocks 2 to 5.

From both the acquisition of the measurement values in Block 2 as well as from the load case identification in Block 8, the operating data are picked up in Block 11 and stored in a data memory, a so-called log, identified as Block 12 in FIG. 1. As a supplement, it can be provided (not shown) that the results of the calculation of the stress distribution in Block 4 and the formation of the stress pattern in Block 10 are balanced continuously on the basis of the load case identification in Block 8, and the worst case is made the basis for determining the usage factor in order to ensure maximum safety. This makes it possible to determine the superpositions of stresses for the monitored building blocks which occur during certain load cases that can be taken from the load case identification.

From the data determined in this manner, data for building blockrelated life-extending modes of operation can be obtained.

Figure 10:
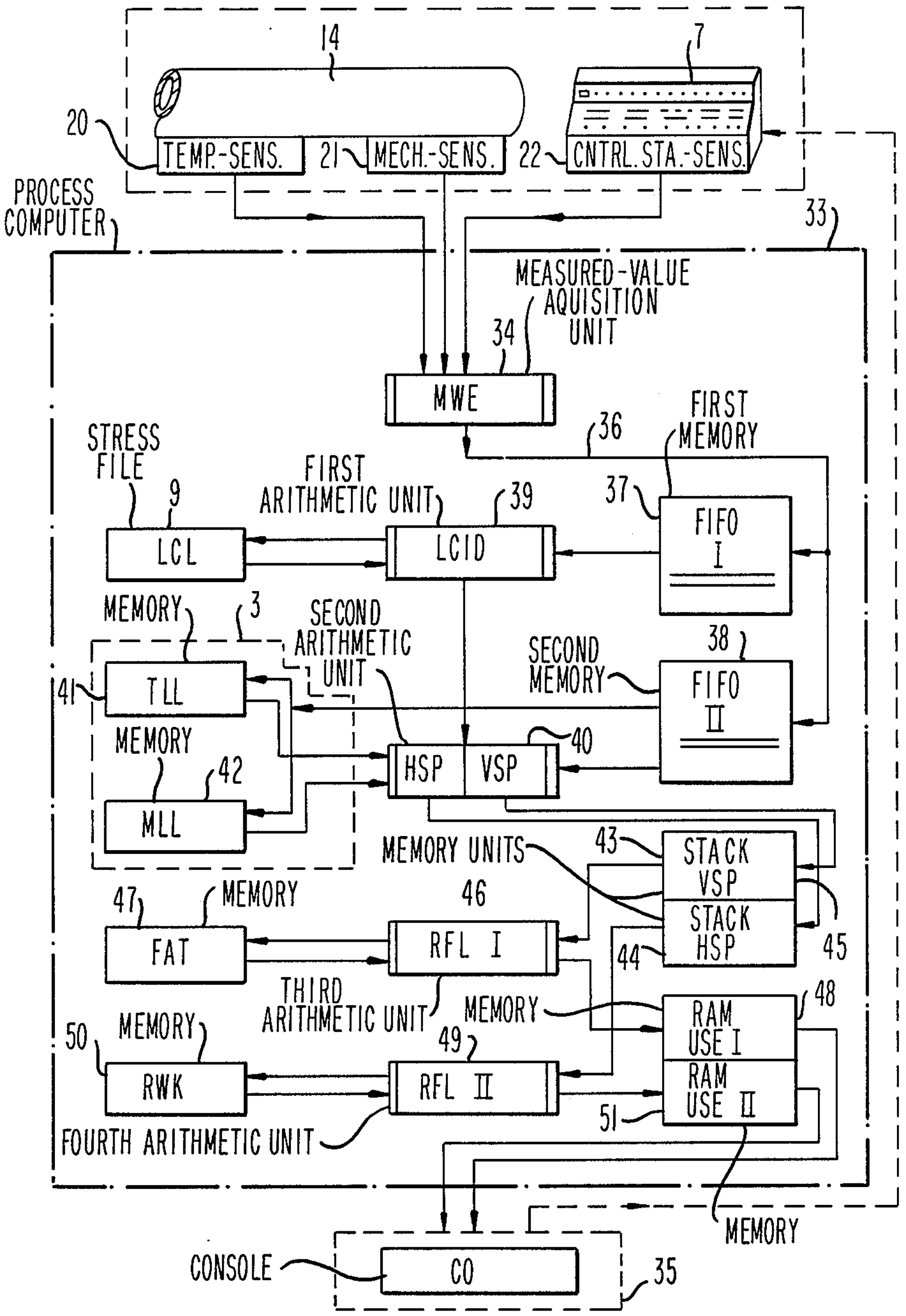
FIG. 10 is a block diagram of an embodiment of a system for performing the method of the invention.

FIG. 10 shows the circuit-wise realization of the invention.

The measurement values relevant for the subject of the application come from three different sources at which measurements are taken regarding a tube 14 in a nuclear power plant shown in FIGS. 3 and 10, namely, the temperature sensors 13, the mechanical sensors 15, 21 as well as the sensors 22 of the control station 7, from which the nuclear power plant is controlled.

The temperature sensors 13, 20 furnish the measurement values which are required for the hereinafore-described backward temperature analysis. The mechanical sensors 15, 21 stand for such signal transmitters or measuring sensors which afford information regarding mechanical stresses such as measuring devices for internal pressure, flow velocity, filling level readings, and so forth. The operating signals emanating from the sensors 22 of the control station 7 can be used for determining the instantaneous operating state (load case) of the operating system 1 and the power plant or generating station, respectively.

From the three units 20, 21 and 22 in FIG. 10, lines go to a process computer 33 and, more specifically, to a unit for measurement value acquisition MWE 34 after possibly necessary analog-to-digital conversion. In the unit for measured-value acquisition MWE 34, the measured values transmitted from the temperature sensors 13, 20 and the mechanical sensors 15, 21 and the operating signals delivered by the sensors 22 of the control station 7, respectively, are processed, smoothed, classified and checked for plausibility. In unclear or critical cases detected in the plausibility check, reports are delivered from there directly to a so-called console CO 35 which may be located in the control station 7.

Within the process computer unit 33 shown in FIG. 10, there are drawn on the left-hand side ROM (read-only memory) data and program memories, and on the right-hand side RAM (random access memory) working memories. A first memory FIFO I 37 (first in, first out) and a second memory FIFO II 38 are connected to the unit for measured-value acquisition MWE 34 via a data bus 36. The data which are read-in first in time are also read-out first in time. The memories 37, 38 are buffer memories. The first memory 37 is interactively connected to the first arithmetic unit LCID 39 (load case identification) which serves for the identification of the individual load cases.

The basis for the identification of the individual load cases are the operating signals received from the sensors 22 of the control station 7. The arithmetic unit LCID 39 determines, on the basis of the thus identified load cases from the stress file for specified load cases LCL 9, comparison stress values to identified load cases and part-dependent weighting factors determined by various sensors for these comparison stress values, and stores them for later superposition in a non-illustrated working memory associated with the first arithmetic unit HSP/VSP 40.

The measured temperature and stress values processed by the measurement value acquisition go directly into the second memory FIFO II 38 and from there to the stress file for unit load cases 3 which contains the first unit load memory TLL 41 (thermal load library) for thermal load cases and the second unit load memory MLL 42 (mechanical load library) for mechanical load cases. In the memory TLL 41, all those comparison stress patterns are stored which are assigned to the individual thermal elementary transients. In the memory MLL 42 are stored those comparison stress patterns which are assigned to the mechanical elementary transients. Using the data deposited by the arithmetic unit LCID 39 and the stress values stored in the memories MLL and TLL, respectively, for mechanical and thermal unit load cases, the second arithmetic unit VSP 40 then determines the resulting stress pattern (for the main and comparison stresses) through superimposition and stores it in the memory STACK HSP VSP 43. The latter is subdivided into two memory units 44 and 45 for the main stresses (HSP) and the determined comparison stresses (VSP).

The resulting comparison stress pattern stored in the memory unit 44 of the working memory STACK HSP VSP 43 is computed in the third arithmetic unit RFL (Rainflow) 46 with the aid of material-dependent fatigue curves (note FIG. 2) stored in the memory FAT (Fatigue) 47 with the aforementioned Rainflow or Reservoir algorithm. The partial usage factors produced are added to the usage factor already stored in the memory RAM USE I 48.

In addition, starting from a crack depth measured otherwise, for example, by ultrasonic tests, at the inside wall or, starting from a crack depth assumed or postulated for example, from experience and taking as a basis the principal stresses produced in the second arithmetic unit HSP/VSP 40 during the operation of the operating system i.e. the stresses produced in the three coordinate axes, the crack growth can be calculated. To this end, the principal stresses produced in the arithmetic unit HSP/VSP 40 are stored in the memory unit STACK HSP 44 of the memory STACK HSP/VSP 43 and called up from there by a fourth arithmetic unit RFL II 49 and computed on the basis of the stress-dependent crack growth curves stored in the memory RWK 50. The result of the calculation, the crack growth per load unit, is added to the crack lengths stored hereinbefore in the memory RAM USE II 51.

The process computer 33 is connected to the console CO 35 which has the usual peripheral equipment (printer, recorder, and so forth) and wherein the usage factor as well as the accumulated crack lengths can be read. The console 35, which is usually installed in the control station 7 affords planning of the timely replacement of component parts utilized in predictable or foreseeable time periods. It also permits the operating system to be performed so that the most imperiled or most worn parts are protected best.

We claim:

1. Method for monitoring fatigue of thermally and/or mechanically stressed structural components having sensors connected to a process computer, comprising:

(a) feeding values measured by the sensors during a given timing cycle to the process computer;

(b) computing weighting factors in a first arithmetic unit from the measured values and stress data obtained from mechanical unit load cases or specific load case comparative stress data stored in a stress file;

(c) computing in a second arithmetic unit comparative values by weighting the measured values obtained through an acquisition unit with the weighting factors obtained from the first arithmetic unit, stored in the working memory after dissolving the measured values into corresponding weighted unit values obtained from two unit load-case libraries and weighted and stored in synchronism as stress data in a second memory;

(d) steering the second memory by means of a third arithmetic unit for forming a stress distribution curve and obtaining from the stress distribution curve partial usage factors developed during said timing cycle; and (e) storing cumulatively the partial usage factors in a further working memory being added to the previously stored partial usage factors, obtaining therefrom an overall load factor.

2. Method according to claim 1, which comprises placing the sensors in the form of temperature sensors on the outside of the component part which is to be monitored, locating the sensors at a region of the component part insulated from the temperature sensors; and storing elementary stress data as waveform data in the first memory in a form corresponding to thermal unit waveforms.

3. Method according to claim 1, wherein the sensors are mechanical sensors, and the elementary stress waveform data stored in the first memory correspond to mechanical unit load cases.

4. Method according to claim 9, which includes identifying with the first arithmetic unit the respectively determined load case of the operating system from the operating signals which are delivered from a control station to the operating system, part of which is the component part to be monitored; storing in a fourth memory assigned to the first arithmetic unit, the stress waveform data specific to the component part correlated with the load case identified therein; feeding the stress waveform data correlated to with the respective load case via a third buffer memory to the second arithmetic unit; and approximating, with the second arithmetic unit, by superposition of the stress waveform data from the third buffer memory actual comparison stress curve data, and storing the actual comparison stress curve data in the second memory.

5. Method according to claim 4, which includes storing weighted principal stress data accumulated in the second arithmetic unit in the second memory; converting the stress data with the third arithmetic unit, utilizing stress-dependent crack growth data stored in another memory, into crack growth values obtained during an evaluation cycle; and adding the crack growth values to crack lengths stored in a further memory.

6. Method according to claim 1, which includes determining and storing together with the respective load case, superimposed stress distribution data determined specifically for the respective component part from the measured values during specific load cases determined by a control station, the superimposed stress distribution data calculated by the second arithmetic unit.

7. Method according to claim 6, which includes converting by the third arithmetic unit the superimposed stress distribution data calculated specifically for the respective part and for given load cases, into partial usage factors specific to the respective component part, and documenting them by performing a plausibility check thereon.

8. Method according to claim 6, which includes documenting the superimposed stress distributions which are documented in an operating data acquisition for given load cases specific to the respective component part; and storing the documented superimposed stress distribution data with their respective frequency in a separate file for specific load cases.

9. Apparatus for monitoring fatigue of thermally and/or mechanically stressed structural components, comprising:

(a) sensors for measuring values;

(b) a process computer having a first arithmetic unit, a stress file and a working memory connected to the process computer for computing weighting factors in the first arithmetic unit from values measured by the sensors and stress data obtained from mechanical unit load cases or specific load case comparative stress data stored in a stress file;

(c) a second arithmetic unit for computing comparative values, an acquisition unit for obtaining the measured values, first and second unit load-case libraries and a second memory, for weighting and storing the measured values obtained through the acquisition unit with the weighting factors obtained from the first arithmetic unit, stored in the working memory after dissolving the measured values into corresponding weighted unit values obtained from said first and second unit load-case libraries and weighted and assigned in synchronism in said second memory;

(d) a third arithmetic unit for steering the second memory by means of the third arithmetic unit, a stress distribution curve formed by said third arithmetic unit steering said second memory, and obtaining from the stress distribution curve partial usage factors developed during said timing cycle; and (e) a further working memory for storing cumulatively the partial usage factors in the further working memory and adding them to the previously stored partial usage factors, for obtaining therefrom an overall load factor.

10. Apparatus according to claim 9 including: temperature sensors disposed on the outside surface of the components to be monitored, and wherein said first unit load-case library serves for storing elementary stress data in a form corresponding to thermal unit waveforms.

11. Apparatus according to claim 9 wherein said sensors are: mechanical sensors, the elementary stress waveform data stored in said second unit load-case library serves for storing elementary stress waveform data corresponding to respective mechanical unit load cases.

12. Apparatus according to claim 9, including: a control station and an operating system controlled therefrom by operating signals, means for identifying with the first arithmetic unit the respectively determined load case from the operating signals from the control system to the operating system, part of the operating system being the component part to be monitored; a fourth memory assigned to the first arithmetic unit for storing the stress waveform data specific to the component part correlated with the load case identified therein; the second arithmetic unit serving for receiving the stress waveform data correlated with the respective load case, a third buffer memory connected to the second arithmetic unit serving to transmit the stress waveform data to the second arithmetic unit; the second arithmetic unit operating to form, by superposition, approximated stress waveform data for the actual comparison stress curve data and storing the actual comparison stress curve data in the second memory.

13. Apparatus according to claim 12, wherein the second memory serves for storing weighted principal stress data accumulated in the second arithmetic unit; the third arithmetic unit serves for converting the stress data, utilizing stress-dependent crack growth data stored in another memory, into crack growth values obtained during an evaluation cycle, and including a further memory for storing the crack growth values to crack lengths already stored therein.

14. Apparatus according to claim 9 which includes: a work station, means for determining and storing together with the respective load case superimposed stress distribution data determined specifically for the respective component part from the measured values during specific load cases determined by said control station, the second arithmetic unit serving for calculating the superimposed stress distribution data.

15. Method according to claim 14, including means for converting by the third arithmetic unit the superimposed stress calculated specifically for the respective part and for given load cases, into partial usage factors specific to the respective component part and documenting them by means of a plausability check.

16. Apparatus according to claim 14, including means for documenting the superimposed stress distributions which are documented in an operating data acquisition for given load cases specific to the respective component part; and a separate file for storing the documented superimposed stress distribution data with their respective frequencies for specific load cases.

17. Apparatus for monitoring fatigue of a component having a stressed component part, having temperature sensors attached to the outside surface of the component part, the apparatus which comprises: means for measuring at given timing cycles the outside surface temperature distribution data for the component; a load unit stress file for unit load cases for storing the temperature transient responses to elementary temperature transients; means for determining by regressive analysis best fitting weighting factors to be applied to the temperature transient responses which by superposition thereof provide the best fit with the measured outside surface temperature distribution data; a first working memory for storing said weighting factors determined by the best fit; a unit load case stress file for storing elementary comparison stress pattern data, applying said weighting factors thereto for obtaining actual component part stresses; an arithmetic unit for computing the actual stresses, and using fatigue data for obtaining partial usage factors for the component parts, and a cumulative usage factor memory for storing the partial usage factors.

18. Apparatus according to claim 17, including: a control station for supplying operating signals for determining the identity of system specific load cases; a stress file for supplying the specified load cases stress waveform data for the component parts correlated with the respective identified specific load cases; and means for superimposing the stress waveform data onto the actual component part stresses.

19. Apparatus according to claim 18, wherein the specified load cases include cases selected from the group consisting of slow start-up and fast shut-down of the component.

* * * * *